(No Model.)
E. C. MERRILL.
THERMOSTATIC VALVE REGULATOR.
No. 412,280. Patented Oct. 8, 1889.
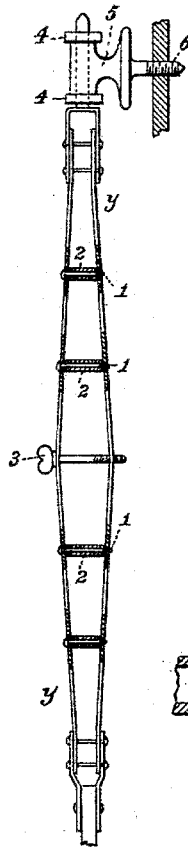
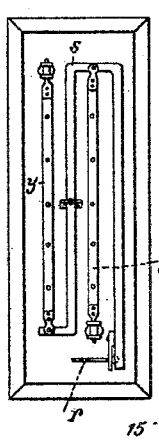
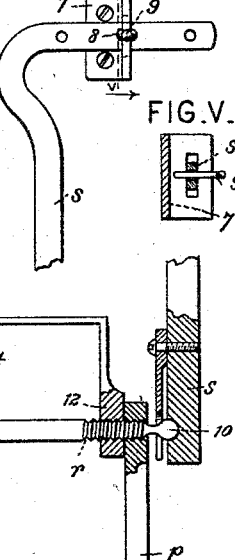
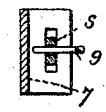
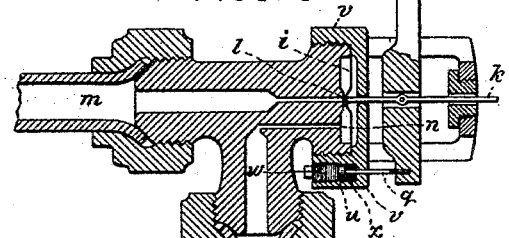
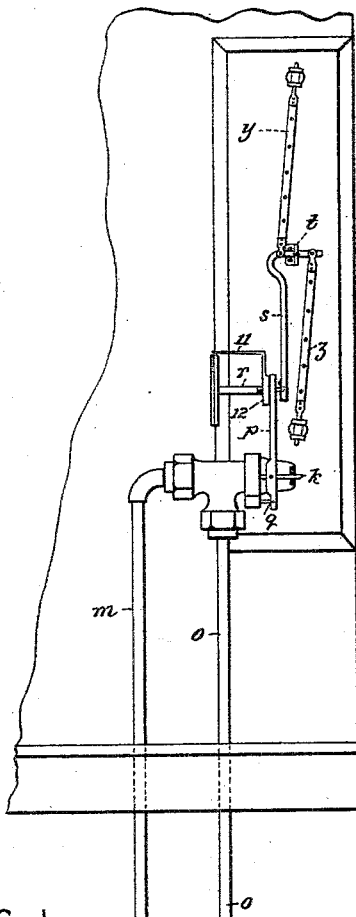
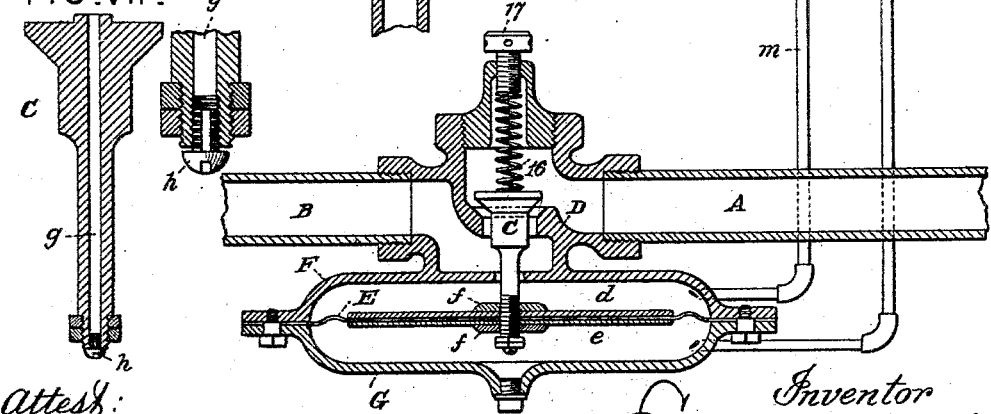
Attest:
Geo. T. Smallwood.
Philip Mauro.
Inventor
Edwin C. Merrill by
A. Pollok his atty

UNITED STATES PATENT OFFICE.

EDWIN C. MERRILL, OF ALLEGHENY, PENNSYLVANIA.

THERMOSTATIC VALVE-REGULATOR.

SPECIFICATION forming part of Letters Patent No. 412,280, dated October 8, 1889.

Application filed March 16, 1889. Serial No. 303,586. (No model.)

*To all whom it may concern:*

Be it known that I, EDWIN C. MERRILL, of Allegheny, in the county of Allegheny and State of Pennsylvania, have invented a new and useful Improvement in Heat-Regulators, which improvement is fully set forth in the following specification.

This invention has reference to apparatus for automatically regulating the temperature of a room or building through the action of a thermostat; and it relates particularly to the regulation of a furnace or other heater using gas as a fuel, though the invention is applicable, wholly or in part, to heaters of different kinds.

The object of the invention is to accomplish the absolute regulation of temperature by apparatus of a simple and efficient character, not liable to get out of order, and which acts solely by the pressure of the fluid fuel without other agency—such as compressed air or electricity—to economize the fuel, and to insure steadiness and uniformity in its supply. To accomplish this latter object requires apparatus which responds almost instantly to slight fluctuations in temperature, so that the changes in pressure in the main are slight and gradual and not suddenly changed from one extreme to the other.

According to the present invention the supply of gaseous fuel is regulated by a main valve placed in the supply-pipe and supported and actuated by a flexible diaphragm, so that the supply is under perfect control and may be regulated to a nicety. This main valve is controlled by a secondary or auxiliary valve placed in a small branch pipe connected with the main supply-pipe. The branch pipe is preferably placed around the diaphragm and fed through a permanent opening through the main valve and diaphragm. Thus the pressure of the gas itself furnishes the power for effecting the necessary changes in the position of the main valve. The secondary valve is under the control of a thermostat placed in the room whose temperature is to be regulated.

For the purposes of this invention the thermostat must be very sensitive, and must be constructed to yield under changes of temperature considerable motion and power.

The present invention includes a thermostat adapted to control effectually the motions of the secondary valve.

The gas in the small branch pipe above referred to, after passing through the secondary valve, returns by a suitable pipe to the delivery-chamber on the same side of the diaphragm as the feed or delivery pipe, and thence passes to the furnace; and since the secondary valve is always open while the main valve is closed, and vice versa, it follows that under all circumstances, so long as there is pressure in the supply-pipe, there is a constant supply of gas sufficient to maintain a light at the burner. Thus by the present invention the small quantity of gas that is admitted for the purpose of actuating the main valve serves also the purpose of maintaining constant ignition at the burner. This is an important feature of the invention.

The invention includes various features of construction, designed to render the apparatus convenient and effective in operation, and certain particular arrangements and combinations of parts, as hereinafter fully set forth.

In the accompanying drawings, Figure I is a sectional elevation of an apparatus constructed in accordance with the invention; Fig. II, a view in section, on a larger scale, of the secondary valve and connected parts. Fig. III is an enlarged view of one of the expansible arms; Figs. IV and V, details illustrating the adjustable fulcrum of the thermostat-lever; Fig. VI, an elevation illustrating another arrangement of the thermostat arms and lever, and Fig. VII details in section illustrating the main valve.

A represents the main supply-pipe; B, the feed-pipe leading to the furnace, and C the main valve seated in the partition D.

E is a flexible diaphragm, secured at its edges between the castings F and G and dividing the space between said castings into two chambers *d e*, the upper or delivery chamber *d* being in free communication with the feed-pipe B. The main valve C is connected to the center of the diaphragm E by jam-nuts *f*, so that it follows every motion of said diaphragm. Valve C has a small hole or channel $g$ passing entirely through the same and through the diaphragm and affording a permanent passage for a small quantity of gas from supply-pipe A to chamber $e$. This channel is always open; but its size can be regulated by the small screw $h$, Fig. VII.

The secondary valve, which controls the main valve, is shown as a diaphragm $i$, having a stem $k$ attached to its center, by which the valve can be moved to close or open the port $l$, which has at its orifice a raised rim or shoulder, forming a valve-seat. Port $l$ communicates by return-pipe $m$ with chamber $d$, and port $n$, which is to one side of port $l$, communicates by pipe $o$ with chamber $e$. Gas thus passes from the supply-pipe A through passage $g$ in valve C to chamber $e$, thence by pipe $o$ to port $n$, and back (if valve $i$ be open) by pipe $m$ to chamber $d$, and thence to delivery-pipe B.

The valve-stem $k$ of the secondary valve is connected to the valve-actuating lever $p$, the latter being fulcrumed at $q$. Lever $p$ is connected by screw $r$ with the lever $s$ of the thermostat, said lever being fulcrumed at $t$. The construction of these parts is best illustrated in Fig. II. As therein shown, the pin $q$, to which the actuating-lever $p$ is fulcrumed, is provided with a cross-head $u$, inclosed in a hole bored in the screw-cap $v$, by which the valve $i$ is covered. Head $u$ bears at one end against the screw $w$. On its other side is a rubber packing $x$, which under normal conditions holds pin $q$ in one position. Should, however, unusual expansion of the thermostatic arms force the valve $i$ with undue pressure against its seat, the packing $x$ could yield, permitting pin $q$ to move outward before the strain would be sufficient to bend or otherwise derange the parts.

As shown, two thermostatic or expansible arms $y$ $z$ are used, although one would in some cases at least suffice. They are connected to opposite sides of the fulcrum $t$ of lever $s$, so that they act in the same direction and supplement each other. The construction of one of the arms is shown in Fig. III. It is composed of two thin strips of metal—such as zinc—bent so as to converge toward each other at the ends and connected at a number of points by screws 1. These connecting-screws are each surrounded by a metal sleeve 2, the screw being tightened until the metal strips or plates are drawn up against the ends of the sleeve.

To provide means for adjustment in case of any alteration in the length of the arms, an adjusting-screw 3 is provided, by means of which the strips can be slightly drawn together or forced apart to elongate or shorten the arms. The adjustment thus furnished is very slight, but is sufficient for the purpose, since the length of the arms at a given temperature is not likely to vary, even after long use, beyond a very small amount. A more ample adjustment, should it be needed, is furnished by the nuts 4, by which the end of the arm $x$ is secured to a sleeve 5, attached to screw 6, which is screwed into the case.

The two expansible arms $x$ and $y$ being constructed alike, and being connected with lever $s$ at equal distances from the fulcrum thereof, would act with practically equal effect upon said lever; but these conditions of absolute equality are difficult to secure, and consequently the motion of one arm might at times be resisted by the other, producing strain on the lever $s$, or friction at its pivot. To avoid this the lever $s$ is so mounted that its fulcrum has freedom of motion in the direction of the expansion and contraction of the arms $x$ and $y$—that is to say, in a vertical direction—when the apparatus is arranged as shown in the drawings. The construction of the parts is illustrated in Figs. IV and V. As therein shown, the lever $s$ passes through a slot in the bracket 7, which is screwed to the case, the slot being enough wider than the case to permit the latter's moving up and down therein. Lever $s$ is perforated at 8 and a split pin 9 straddles bracket 7, its two prongs passing on opposite sides thereof through hole 8. The fulcrum of lever $s$ can thus freely change its position to compensate for any differential expansion or contraction of arms $x$ $y$.

Screw $r$, which connects actuating-lever $p$ with thermostat-lever $s$, is adjustable and furnishes the means whereby the temperature to be maintained may be varied at will. It is obvious that the shorter the space between the contiguous ends of levers $p$ and $s$ the sooner the valve $i$ will close, and vice versa. Screw $r$ passes through lever $p$ and has a balled end 10, which fits in a socket in lever $s$, so that by turning the screw in one direction or the other the space between them may be varied. In order that the regulation may be effected accurately, the edge (or it may be the face) of the head of screw $r$ is graduated to degrees corresponding to those on a thermometer and an index-finger 11 is provided, it being attached to a jam-nut 12, by which the screw is locked in position when once set. To vary the normal or constant temperature to be maintained, it is only necessary to turn the screw until the figures indicating the desired temperature are opposite the index-finger 11. In practice this is effected by first turning the jam-nut (or the screw according as the temperature is to be raised or lowered) until the finger comes opposite the proper figures, and then turning both nut and screw together until the latter is locked by contact of the nut with lever $p$.

It may happen that by slight alteration of the relative positions of the parts incidental to the use of the apparatus a discrepancy will be created between the temperature, as indicated by the thermometer, and the degree to which the instrument is set, as indicated by the index-finger. To correct such discrepancy, it is preferred to place the figures on one disk 14 and the graduating-marks on another 15, adjacent thereto, but capable of turning independently thereof on the shank of screw $r$. In case such a discrepancy as above indicated be observed it may be corrected by changing the relative positions of the two disks until the temperature, as shown by the thermometer, corresponds with the figures opposite the index-finger.

Referring to Fig. 1, it will be observed that, in addition to the weight of the main valve C, a coiled spring 16, whose pressure is controlled by an adjusting-screw 17, is provided to co-operate in closing the valve. When the parts are arranged in the position shown in the drawings, this spring is not indispensable; but should it be more convenient to arrange the apparatus so that the valve and diaphragm move horizontally, instead of vertically, or to turn it upside down, the use of the spring is important.

If it be desirable to economize space, the length of the thermostat may be lessened by adopting the arrangement illustrated in Fig. VI. As therein shown, the thermostat-lever $s$ is bent back upon itself, assuming the form of an inverted $\mathsf{U}$, the arm $y$ being connected thereto at its free end and the arm $z$ at the bend. The fulcrum $t$ of the lever is at the middle of the upright portion between the connections of the two arms $y$ and $z$.

Having now described the construction of the various parts, the operation of the apparatus will be briefly explained.

The thermostat being set by means of screw $r$ to maintain the temperature desired, the main valve C will assume such position as to pass sufficient fuel to the furnace to produce the requisite heat. In this position the secondary valve may be entirely closed, or it may be passing a small quantity of gas, according as the pressure in chamber $d$ equals or only approximates that in chamber $e$. Should the temperature rise above the normal, owing to change of pressure in the main, or to a variation of atmospheric conditions, the arms $y$ $z$ will expand, moving levers $s$ and $p$ in the direction to open the valve $i$. A preponderance of pressure is thus produced in chamber $d$, in consequence of which the diaphragm and main valve fall a corresponding extent, thus reducing the supply proportionately. When the temperature falls, the arms $y$ $z$ contract, closing the secondary valve. Pressure consequently accumulates in chamber $e$, lifting the diaphragm and main valve. When the main valve opens in consequence of the closing of valve $i$, although gas passes the former freely, the pressure cannot rise in chamber $d$ to such extent as to counteract that in chamber $e$, and thereby force open valve $i$, for while the chamber $d$ has a much fuller supply than chamber $e$, it has a free and ample outlet by the delivery-pipe. As shown, the inlet-pipe $o$ to the secondary valve is led to the port $n$, while the return-pipe $m$ is connected with the central port $l$. The connections, however, can readily be changed, the central port $l$ being connected with the pipe $o$, and vice versa. It is desirable to connect the apparatus as shown in the drawings when working with comparatively low pressures, for the reason that, owing to the bulge in the diaphragm $i$, caused by its stem $k$, the gas issuing from port $n$ has a greater surface exposed, and therefore opposes greater force to the diaphragm than if it issued from the central port, which has a smaller superficial area to act upon.

It will be obvious to those skilled in the art to which my invention relates that modifications may be made in the details of construction without departing from the spirit of the said invention, as by substituting for certain parts described other devices capable of performing the same functions, and that parts of the invention may be used without the whole, though not to the same advantage.

Having now fully described my said invention, what I claim, and desire to secure by Letters Patent, is—

1. The combination of the main regulating-valve arranged to vary the size of the valve-aperture, the secondary valve controlling the pressure of the fluid operating said main valve, and the thermostat connected with and actuating said secondary valve when influenced by changes of temperature, substantially as described.

2. The combination of the main valve, the casing, a flexible diaphragm connected with said main valve and dividing said casing into two chambers, a secondary valve controlling the pressure of the fluid in said chambers, and the thermostat controlling said secondary valve, substantially as described.

3. The combination of the supply-pipe, the delivery-pipe, the main valve regulating the pressure of gas from the one to the other, the secondary valve controlling the pressure of gas in a branch pipe connected with the supply-pipe, and thereby operating said main valve, a thermostat connected with the secondary valve, and a return-pipe from the latter communicating with the feed-pipe, whereby the gas whose pressure is controlled by the secondary valve passes onto the furnace to maintain combustion at the burner, substantially as described.

4. The combination of the supply-pipe, feed-pipe, main regulating-valve having a small permanently-open passage, a secondary valve in a branch pipe supplied by said passage, a diaphragm connected with and actuating said main valve to close the same when the secondary valve is open, and a return-pipe from the secondary valve communicating with the delivery-pipe, whereby a constant supply of gas sufficient to maintain combustion is insured, substantially as described.

5. The combination of the main valve, the diaphragm supporting the same, said main valve having a permanently-open passage through the same, the secondary valve in a pipe around said diaghragm and controlling the pressures on opposite sides thereof, its return-pipe communicating freely with the delivery-pipe to the furnace, and the thermostat controlling said secondary valve, substantially as described.

6. The combination of the main valve, the supporting-diaphragm, the secondary valve in a passage around said diaphragm and controlling the pressures on opposite sides thereof, the valve-stem and actuating-lever for said secondary valve, and a thermostat comprising an expansible arm or arms connected with said actuating-lever through an adjustable connection, substantially as described.

7. The combination of the valve, the secondary valve controlling the same, the actuating-lever therefor, and the thermostat-lever for actuating the same, said actuating-lever being pivoted to a part which is held in position with yielding pressure, substantially as described.

8. The combination, with a valve, of a thermostat connected therewith and comprising an expansible arm composed of two metal strips curved in opposite directions, with their concave sides facing each other and held together at several points by means of screws or rivets, substantially as described.

9. The combination, with a valve, of a thermostat for actuating the same and comprising a lever and two expansible arms connected with said lever on opposite sides of its fulcrum, substantially as described.

10. The combination, with a valve, of a thermostat for actuating the same and comprising a lever and two expansible arms connected with said lever on opposite sides of its fulcrum, the said fulcrum being movable in the direction of the pull and thrust of said arms, substantially as described.

11. The combination, with the valve and thermostat-lever, of an expansible arm composed of thin metal plates or strips fastened together at several points by rivets or screws, and provided with an adjusting-screw, substantially as described.

12. The combination of the valve, the actuating-lever therefor, the thermostat-lever, and expansible arm or arms for actuating the same, and a screw passing through one of said levers and connected with the other by a flexible joint, whereby the space between said levers may be adjusted, substantially as described.

13. The combination of the valve, the actuating-lever therefor, the thermostat-lever, and the adjusting-screw connecting said levers, and provided with graduating-marks corresponding to degrees on a thermometer, substantially as described.

14. The combination of the valve, its actuating-lever, the thermostat-lever, the graduated adjusting-screw connecting the two levers, and the jam-nut carrying the index-finger, substantially as described.

15. The combination of the valve, its actuating-lever, the thermostat-lever, and the adjusting-screw connecting the two levers and having its head composed of two adjacent disks capable of turning independently of each other, one of said disks having graduating lines corresponding with the degrees on a thermometer and the other having figures indicative of such degrees, substantially as described.

16. The combination of the valve and the thermostat for actuating the same, said thermostat comprising a bent lever and two expansible arms connected therewith at the bend and at the free end, respectively, said lever being fulcrumed at a point intermediate between said connections, substantially as described.

In testimony whereof I have signed this specification in the presence of two subscribing witnesses.

EDWIN C. MERRILL.

Witnesses:
WM. K. GRAY,
JOS. MILLER.